US009182145B2

(12) United States Patent
Lin

(10) Patent No.: US 9,182,145 B2
(45) Date of Patent: Nov. 10, 2015

(54) SOLAR COOKING APPLIANCES

(75) Inventor: Huazi Lin, Richmond Hill (CA)

(73) Assignees: W&E International Corp., Richmond Hill (CA); Huazi Lin, Richmond Hill (CA)

(*) Notice: Subject to any disclaimer, the term of this patent is extended or adjusted under 35 U.S.C. 154(b) by 557 days.

(21) Appl. No.: 13/355,201

(22) Filed: Jan. 20, 2012

(65) Prior Publication Data
US 2012/0145145 A1    Jun. 14, 2012

Related U.S. Application Data

(63) Continuation of application No. PCT/CA2010/001118, filed on Jul. 19, 2010, and a continuation of application No. PCT/CA2010/001119, filed on Jul. 19, 2010, and a continuation of application No. PCT/CA2010/001120, filed on Jul. 19, 2010.

(30) Foreign Application Priority Data

Jul. 23, 2009 (CA) .................................. 2,672,760
Jul. 23, 2009 (CA) .................................. 2,673,702
Jul. 23, 2009 (CA) .................................. 2,673,703

(51) Int. Cl.
*F24J 2/02* (2006.01)
*F24J 2/05* (2006.01)
*F24J 2/34* (2006.01)

(52) U.S. Cl.
CPC .. *F24J 2/02* (2013.01); *F24J 2/055* (2013.01); *F24J 2/34* (2013.01); *Y02B 40/18* (2013.01); *Y02E 10/44* (2013.01)

(58) Field of Classification Search
CPC .................................. Y02E 10/44; F24J 2/07
USPC .................. 126/600, 648, 617, 618–621, 681
See application file for complete search history.

(56) References Cited

U.S. PATENT DOCUMENTS 742,961 A * 11/1903 Boone .......................... 126/681
1,442,696 A * 1/1923 Nutt .............................. 126/681
3,938,497 A * 2/1976 Andrassy ..................... 126/682

(Continued)

FOREIGN PATENT DOCUMENTS

CN           201206904 Y    3/2009
WO   WO 2009039925 A1 *   4/2009    ............... H05B 6/12

OTHER PUBLICATIONS

Reynolds. "Reynolds Wrap Aluminum Foil". Dec. 11, 2007. <http://web.archive.org/web/20070112045305/http://www.alcoa.com/reynoldskitchens/en/product.asp?cat_id=1337[]_id=17 89>.*

(Continued)

*Primary Examiner* — Steven B McAllister
*Assistant Examiner* — Rabeeul Zuberi
(74) *Attorney, Agent, or Firm* — WPAT, PC; Justin King

(57) ABSTRACT

A solar cooking appliance comprising a solar heat collector to collect and store solar heat, a heat storage and conducting material partially filling said solar heat collector and a set of solar cooking utensils, where each utensil is sized to fit a shape and size of the internal shape and size of the solar heat collector. The utensil has a wall which is heatingly connected to the heat storage and conducting material and an internal wall of the solar heat collector to receive solar heat for cooking food. The utensil further comprises a removable part for opening and closing said utensils during cooking.

13 Claims, 3 Drawing Sheets

(56) References Cited

U.S. PATENT DOCUMENTS

| | | | | |
|---|---|---|---|---|
| 4,142,513 | A | * | 3/1979 | Auger ............................ 126/634 |
| 4,281,644 | A | * | 8/1981 | Chiles ........................... 126/682 |
| 4,442,828 | A | * | 4/1984 | Takeuchi et al. .............. 126/681 |
| 4,834,066 | A | * | 5/1989 | Collins et al. ................. 126/654 |
| 5,167,218 | A | * | 12/1992 | Deakin ......................... 126/569 |
| 6,124,575 | A | * | 9/2000 | Black ........................ 219/465.1 |
| 7,412,976 | B2 | * | 8/2008 | Winston ........................ 126/684 |
| 2008/0271731 | A1 | * | 11/2008 | Winston ........................ 126/684 |
| 2008/0283046 | A1 | * | 11/2008 | Hsu ............................... 126/655 |
| 2009/0133688 | A1 | * | 5/2009 | La ................................. 126/681 |
| 2010/0139648 | A1 | * | 6/2010 | Bourke ......................... 126/681 |

OTHER PUBLICATIONS

Muller Dr Heinz-Joachim, "Solar Steam Cooker", ISES-AP 2008 [retrieved on Dec. 10, 2010], 46th ANZSES (Australian and New Zealand Solar Energy Society) Conference [online]. Retrieved from the Internet: <URL:http://www.sun2steam.com.au/solarcooker/cooker.pdf>.

* cited by examiner

SOLAR COOKING APPLIANCES

CROSS-REFERENCE TO RELATED APPLICATIONS

This application is a continuation of International Application No. PCT/CA2010/001118 filed on Jul. 19, 2010, PCT/CA2010/001119 filed on Jul. 19, 2010, and PCT/CA2010/001120 filed on Jul. 19, 2010, which these PCT applications further claim priorities over the Canadian Application No. 2,672,760 filed on Jul. 23, 2009, Canadian Application No. 2,673,703 filed on Jul. 23, 2009, and Canadian Application No. 2,673,702 filed on Jul. 23, 2009, respectively. The entire contents of which are incorporated herein by reference.

FIELD OF TECHNOLOGY

The present disclosure relates to solar heat application field, especially related to solar cooking appliances to cook the food in the solar heat collector.

BACKGROUND

For all kinds of existing energy sources in the earth, solar energy is the most widespread, the richest and the most uniformly distributed energy source. Solar energy can be used very easily. It is available every day, everywhere and for every body.

For all kinds of human energy consuming activities, cooking food and beverage is the most often activity and has the longest history. Every body in anywhere needs to cook the foods every day.

It is very interesting and valuable topic to use solar energy for food cooking. There are many efforts in this field. (Please refer to the existing patents).

The solar power on a unit earth area is not very large. The solar radiation intensity is varied from North to South and from morning to afternoon. It depends on the weather and is also different in four seasons, so that to develop an economic solar cooking appliance is always a challenge and need continue efforts.

In view of these difficulties, some solar cooking appliances tried to make the sunlight receiving area as large as possible. But the heat insulation for the received heat is difficult. Some solar cooking appliances follow and focus the sunlight using expensive automation system and need additional power to run the system. Some solar cooking appliances also use the heat storage materials. The materials may be expensive and not easy to get.

Therefore, it is an important topic for the industry to further develop and improve applications of the solar cooking technology to develop a set of economic and practicable solar cooking appliances.

SUMMARY

The object of this disclosure is to improve the existing technologies and provide a set of solar cooking appliances that is economy, easy to manufacture and use and high efficient. The invention takes following steps to overcome the difficulties of applying solar energy for food cooking:

To use the evacuated solar heat collector for optimum heat collecting;

To fill solid heat storage and conducting material in the evacuated solar heat collector for storing and saving heat. It not only to provide a continue and stable cooking heat, but also to provide a cooking temperature higher than the water boiling and steam temperature for more cooking purposes. To use second heat conducting/transferring material to transfer the heat faster from solar heat collector to solar cooking utensil;

A light reflector focuses the surrounding light to the cooking appliances;

A sundial indicates the light direction, an adjustable and rotatable fixing and supporting trestle allows to receiving the highest solar power;

An electric power supply provides a backup power source when the solar power is not enough. Further more, the solar cooking appliances also provide backup heat source or energy storage equipment at low electricity price period for cooking at electric power outage.

Following are the detailed summary of present disclosure.

In accordance with one aspect of the present disclosure there is provided a set of solar cooking appliances, comprising: a solar heat collector to collect and store solar heat, having: a first solid heat storage and conducting material partially filling said solar heat collector, wherein said solar heat collector can heat said first solid heat storage and conducting material to a temperature higher than the water boiling temperature; a solar cooking utensil located within the solar heat collector, wherein said solar cooking utensil is sized to fit a size and shape of the internal size and shape of the solar heat collector, and said utensil having a wall which is thermally connected to the internal wall of the solar heat collector and the first solid heat storage and conducting material to transfer heat to the utensil, and said utensil having a removable part for opening and closing said utensil; and a second heat conducting/transferring material located within said solar heat collector and thermally connected said first solid heat storage and conducting material for faster transferring the solar heat to said cooking utensil, wherein said second heat conducting/transferring material is selected from a group of: a heat tube, a metal conductor, an alloy conductor and a heat conductive conductor able faster transferring heat, and the necessary accessories that including a fixing and supporting trestle with a rotatable base and adjustable incidence angle that arrange and support the each part of the solar cooking appliances at a proper situation; the light reflecting object and a cone bar attached to the solar heat collector perpendicularly to show the angle of sun light.

The said solar heat collector is a evacuated-tube solar heat collector; or a group of modular evacuated-tube solar heat collectors that mounted in a certain shape, e.g. in parallel row, in full or partial cone-shaped column, etc; the said heat storage and conducting material can be a solid material, or a liquid material or a chemical or change head storage materials, or the combination of two or more materials mentioned above. The said heat conducting material can be a heat tube, or a heat conductor. For safety reason, transparent cover or evacuated toughened-glass tube solar heat collector are suggested.

In accordance with another aspect of the present disclosure there is provided a set of solar cooking utensils, each of said utensil is a cylinder container made of stainless steel, that is located in an evacuated-tube solar heat collector, having a removable and detachable handle at the inner wall; said container having a diameter near but not bigger than the inner diameter of said evacuated-tube solar heat collector; a pleated structure on the wall of said container from the top to the bottom to provide a gap and patch for air exchange and allow a minor adjustable diameter for said container. These utensils can be a solar coffee/tea maker, a steamer, a solar cooking fryer; a cooking wok or pot, a boiler, a cooking pan etc.

In accordance with another aspect of the present disclosure there is provided a set of solar cooking appliances that mainly use the solar heat, but use electricity as a backup, comprising, a solar heat collector to collect and store solar heat; a first solid heat storage and conducting material partially filling said solar heat collector, wherein said solar heat collector can heat said first solid heat storage and conducting material to a temperature higher than the water boiling temperature; a solar cooking utensil located within the solar heat collector, wherein said solar cooking utensil is sized to fit a size and shape of the internal size and shape of the solar heat collector, and said utensil having a wall which is thermally connected to the internal wall of the solar heat collector and the first solid heat storage and conducting material to transfer heat to the utensil, and said utensil having a removable part for opening and closing said utensil; and an electric heater providing a back up of heating source and electric heat storage, comprising: an electric heating element located under the solar cooking utensil and within said first solid heat storage and conducting material; and the necessary accessories that including a fixing and supporting trestle with a rotatable base and adjustable incidence angle that arrange and support the each part of the solar cooking appliances at a proper situation; the light reflecting object and a cone bar attached to the solar heat collector perpendicularly to show the angle of sun light; a electric heat element with power supply and a measuring, indication and controlling systems for the solar cooking appliance's operating characteristic parameter, e.g. timing, temperature, pressure, moisture etc.

Other aspects and features of the present disclosure will become apparent to those ordinarily skilled in the art upon review of the following description of specific embodiments of the invention in conjunction with the accompanying figures.

BRIEF DESCRIPTION OF THE DRAWINGS

In the figures which illustrate exemplary embodiments of this invention.

DETAILED DESCRIPTION

Figure 1:
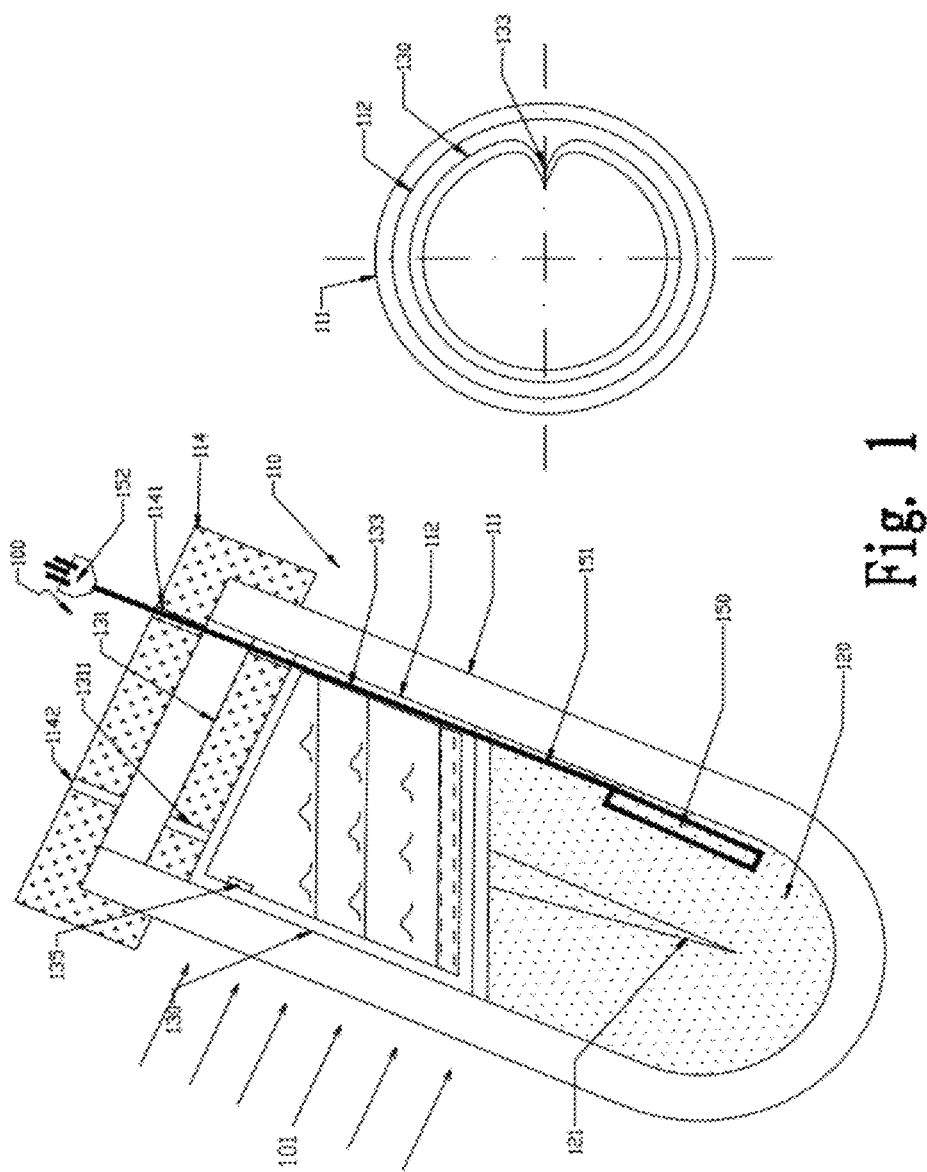
FIG. 1 is a schematic diagram illustrating a evacuated-tube solar cooking appliances in vertical section and cross section view.

Referring to FIG. 1, an evacuated-tube solar cooking appliances are illustrated in vertical section and cross section view during use.

A set of solar cooking appliances 100 includes a solar heat collector 110, the first heat storage and conducting material 120, a second heat conducting/transfering medium 121, a solar cooking utensil 130, a removable part 114 of 110 and a removable part 131 for 130, and a electric heat element 150 with power supply.

Solar heat collector may be any kind of solar heat collector that can heat the first heat storage and conducting material 120 to the temperature higher than the water boiling temperature. In this case, the solar heat collector 110 is an evacuated-tube solar heat collector. It may also is a group of modular evacuated-tube solar heat collectors that mounted in a certain shape, e.g. in parallel row, in full or partial cone-shaped column such as its one of the examples shown in FIG. 2. The solar heat collector 110 has a removable part 114 with two holes 1141 and 1142. The hole 1141 is a path of power cable and air. The hole 1142 is to continue the hole 1311 for releasing of cooking steam.

The evacuated-tube solar heat collectors 110 has transparent outer layer 111 and inner layer 112. It is evacuated in between. The inner layer 112 has a heat absorbing coating that does not show in the FIG. 1. The evacuated-tube solar heat collector 110 has the same material and manufacture processing as the evacuated-tube solar heat collector that used for solar water heating. But the evacuated-tube solar heat collector used in solar cooking has a larger diameter and comparing to the regular evacuated-tube.

The evacuated-tube solar heat collector 110 is made of glass. In case the glass tube is broken, the glass piece is dangers for the user. So the solar heat collector has a transparent (e.g. plastic) cover for safety reason. (not shown in FIG. 1). The transparent plastic cover can be either the mantles for each tube or a protective cover for an entire collector panel. But the plastic protective mantles may reduce the efficiency of the solar heat collector. So an evacuated toughened-glass tube solar heat collector is a better solution.

The first heat storage and conducting material 120 in this case is salt or quartz sand for storing the solar heat and transferring heat to the cooking utensil 130. In fact, many kinds of the materials can be used as the solar heat storage and conducting material. For example, they are solid materials such as salt and sand, ; phase change material, such as paraffin and metals. The cook takes place in the tube wherein utensil is located, so the food safety needs to put special attention. In this invention, we prefer the salt, quartz or basalt sand, and large piece of metal. For the first heat storage and conducting materials, in addition to the materials mentioned above, metal or alloy conductors and heat tube are also suitable alternatives.

In FIG. 1 there is second heat conducting/transferring material 121. In this case, this is a copper conductor in T shape inserted in the heat storage and conducting material 120 for faster transferring the solar heat to the cooking utensil 130. The conductor 121 can be any other heat conductivity conductor or a heat tube. The second heat conducting/transferring material 121 is a supplemental component. In many cases, even without the heat conducting material 121, the solar cooking appliances can still perform well.

The cooking utensil 130 is a cylinder container located inside of solar heat collector 110 upper the salt or sand 120. It made of stainless steel. The cooking utensil 130 has a removable part 131 with a hole 1311, it is a stopper inserted in the cooking utensil 130. The utensil has a diameter near but not bigger than the inner diameter of the evacuated-tube solar heat collector 110. A pleated structure 133 is on the wall of the container from the top to the bottom to provide a gap and patch for air exchange and power cable 151. Furthermore it allows a minor adjustable diameter for the container 130. The cooking utensil 130 further includes a removable and detachable handle 135 at the inner wall for removing the utensil 130 from the solar heat collector 110.

In FIG. 1, the utensil 130 is a food steamer. Three layers of steam basket are arranged in the utensil upper the water in the bottom. The food is cooked on the steam basket. In fact, the cylinder container, i.e. the utensil 130, can be many kinds of the utensils. We can have a set of cylinder containers for different cooking purposes. For example, second container can have water and coffee or tea for cooking. It is a solar coffee/tea maker. Third container can have a wire mesh container to hold food when frying and drain them after cooked. It is a solar cooking fryer. Fourth container can have a whisker net made of several curved and intersecting steel wires used to press the food sheets close to the inner wall of container for roasting or baking. Fifth container can back and roast breads and cookies. Of cause, if in the container food and water are arranged for braising or boiling. It is a cooking wok or pot. Based on above descriptions, it is believed that other modifications to the utensils used in this solar heat collector 110 will be apparent to those skilled in the art and, therefore, the invention is defined in the claims.

A removable part 114 covers the top of solar heat collector 110. It has two holes 1141 and 1142. The first hole 1141 connects to said gap and path for air exchange and power cable 133. The second hole 1142 continues the hole 1311 in the stopper 131 of the container 130. The stopper may be a plant fibril cork with an air gap or a hole.

Figure 3:
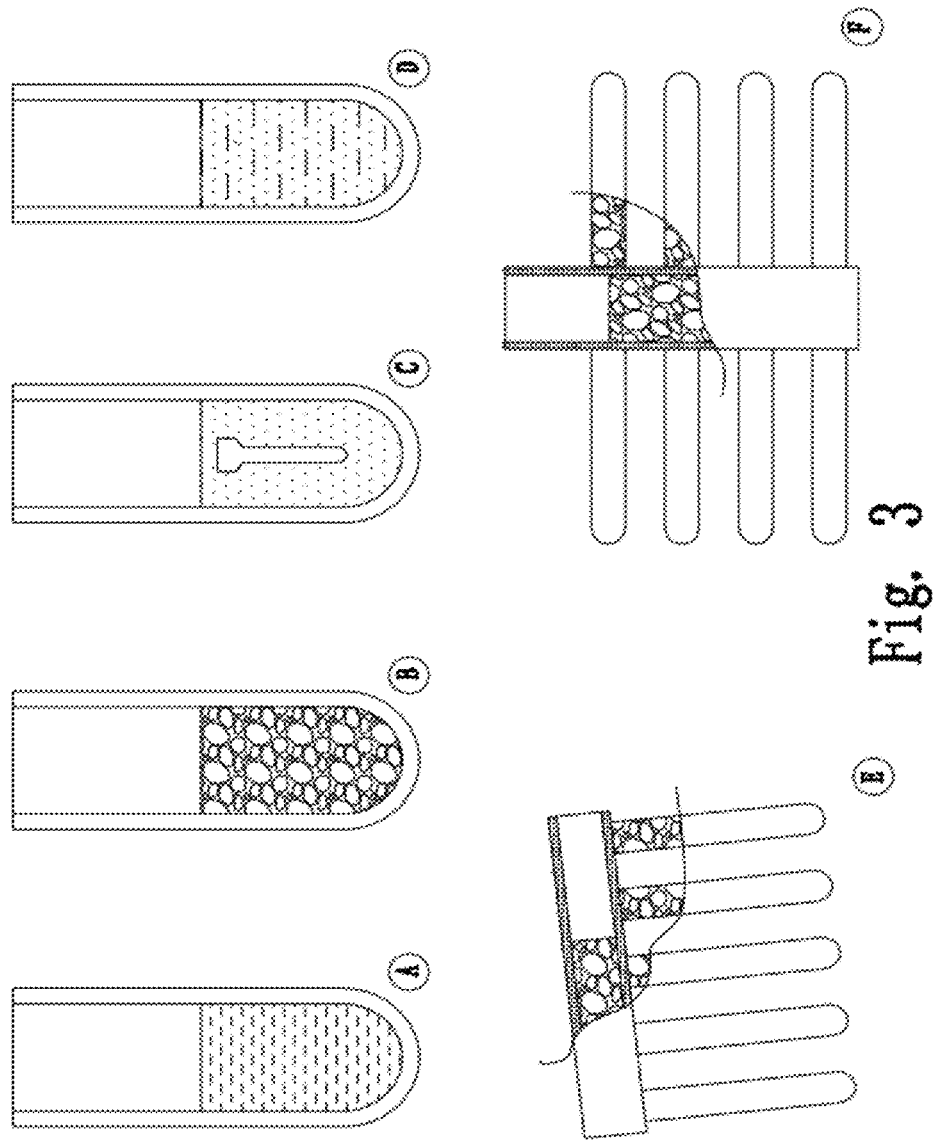
FIG. 3 illustrates schematically a set of exemplary solar heat collectors in vertical section view.

The electric heat element 150 with power supply is a very low power electric heat element. It located under the cooking utensil 130 and/or within heat storage and conducting material 120. A power cable 151 has very high resistive heat temperature that connects the electric heat element 150 to power supply plug 152 outside of the solar heat collector 110, through the path formed by a pleated structure 133 on the walls of the utensil 130. The electric heat element 150 may further includes a measuring, indicating and controlling systems for the solar cooking appliance's operating characteristic parameter, e.g. timing, temperature, pressure, moisture etc. These equipments are not shown in FIG. 1. The electric heat element with power supply can be in solar cooking utensil or removed from the set of cooking appliance. In this case the set of solar cooking appliances is still a complete cooking appliances that use solar heat as only energy source. FIG. 3 shows the solar heat collectors without electric heat element.

Some time the evacuated-tubes are mounted in a raw for cooking several foods at the same time.

Figure 2:
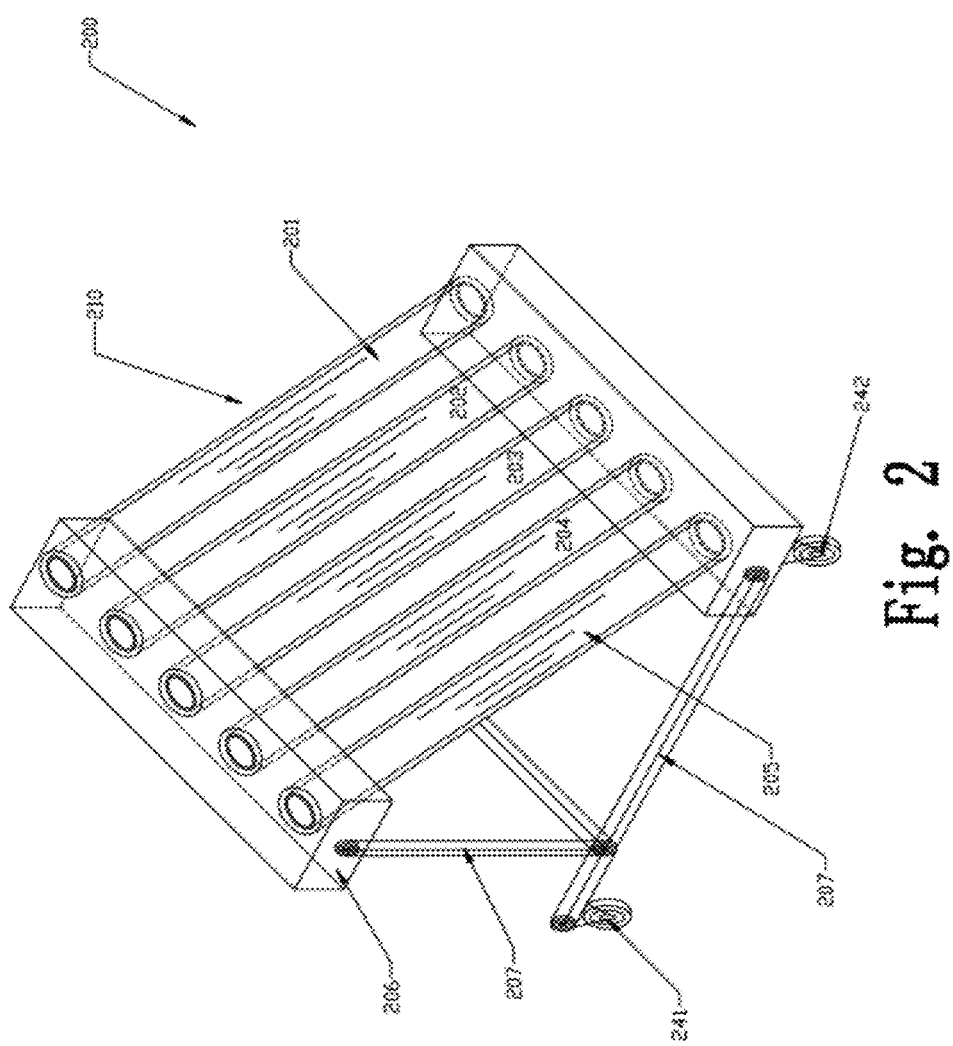
FIG. 2 is a set of solar cooking appliances is illustrated schematically in a perspective view.

Refer to FIG. 2, a set of solar cooking appliances 200 is illustrated schematically in a perspective view. Five evacuated tube solar heat collector 201, 202, 203, 204 and 205 are mounted in a parallel raw.

A fixing and supporting trestle 206 arranges and supports the five solar heat collectors at the proper locations and situations. The movable support 207 allows the adjustment of the incidence angle of the solar heat collector 210 to the sunlight. Four wheels 241, 242, 243 and 244 are installed in the four bottom corners of the supporting trestle 206 for adjust the direction of the solar heat collector 210. (243 and 244 are not shown in FIG. 2). A sundial (not shown in FIG. 2) is a cone bar. It attaches to the solar heat collector 210 perpendicularly for indicating the incidence angle of sunlight;

A light reflecting object (not shown in FIG. 2) is equipped under the evacuated-tube for focusing the surrounding sun light to the solar heat collector;

When the solar light shines on the solar heat collector 210, the cooking processing in each utensil is the same as the processing mentioned in FIG. 1. We'll not repeat it again.

Referring to FIG. 3, a set of exemplary solar heat collectors are illustrated schematically in vertical sections.

The structure A in FIG. 3 is a schematic vertical section view of an evacuated-tube solar heat collector partially filled with liquid heat storage and conduction material, e.g. water or oil. In some cases, water can also be a heat transferring medium for food cooking.

The structure B in FIG. 3 is a schematic vertical section view of an evacuated-tube solar heat collector partially filled with first solid heat storage and conduction material, e.g. ore stone or turves.

The structure C in FIG. 3 is a schematic vertical section view of an evacuated-tube solar heat collector partially filled with sand and having a heat tube or a heat conductor as the second heat conducting/transferring material.

The structure D in FIG. 3 is a schematic vertical section view of an evacuated-tube solar heat collector partially filled with a combination of solid and liquid heat storage and conducting materials, e.g. quartz sand and cooking oil.

The structure E in FIG. 3 is a schematic partial vertical section view of a group of modular evacuated-tube solar heat collectors that mounted in a vertical parallel raw.

The structure F in FIG. 3 is a schematic partial vertical section view of a group of modular evacuated-tube solar heat collectors that mounted in a horizontal parallel raw.

When set up a solar cooking appliance, not only these kinds of solar heat collectors but also more kinds of their varieties and combinations can be selected and used.

Based on the detailed description of the samples, other modifications will be apparent to those skilled in the art and, therefore, the invention is defined in the claims.

What is claimed is:
1. A solar cooking appliance, comprising:
   a solar heat collector, for collecting and storing solar heat, comprising an outer transparent tube and an inner tube within said outer transparent tube;
   a first solid heat storage and conducting material partially filling said inner tube, wherein said inner tube can heat said first solid heat storage and conducting material to a temperature higher than a water boiling temperature;
   a removable solar cooking utensil snuggly fitted within the inner tube, wherein said solar cooking utensil is sized to fit a size and shape of the inner tube, and said utensil having a wall which is thermally connected to the inner tube and the first solid heat storage and conducting material to transfer heat to the utensil, and said utensil having a removable part for opening and closing said utensil, and said utensil is a cylindrical container having a pleated structure on a wall of said cylindrical container, and
   an electric heat providing a backup of heating source and electric heat storage comprising an electric heating element located under the solar cooking u utensil and within said first solid heat storage and conducting material;
   wherein, said pleated structure comprises a pleat reaching both cylindrical ends of said removable solar cooking utensil parallel to a central axis of said removable solar cooking utensil to form a gap for air exchange and a power cable.
2. The solar cooking appliance according to claim 1, wherein said electric heating element is selected from a group of:
   an electric heater comprising a power cable having very high heat resistant temperature connected to an electric heating element via a power supply plug outside of the solar heat collector through a path formed by a pleated structure on the walls of the containers;
   an electric heater comprising an operating data measuring device and a data indicating device, wherein said operating data is selected from a group of:
      operating duration, temperature, pressure, moisture, and a combination of any operating data;
   an electric heater with a controlling system for the solar cooking appliance's operating data, wherein said operating data is selected from a group of: a timing, a temperature, a pressure, a moisture, and a hybrid combination of above mentioned data.

3. The solar cooking appliance according to claim 1, wherein said solar heat collector is selected from a group of: an evacuated-tube solar heat collector and a plurality of modular evacuated-tube solar heat collectors.

4. The solar cooking appliance according to claim 3, further comprises a safety measure selected from the group of: a transparent cover, an evacuated toughened-glass tube solar heat collector or a transparent plastic protective mantle for safety reason.

5. The solar cooking appliance according to claim 1, wherein said first solid heat storage and conducting material is selected from a group of: salt, sand, quartz sand, a solid chemical material, a solid multi- H2O chemical material, a basalt sand, a metal conductor, copper conductor, heat conductive alloy, ore stone, turves, and a combination of two or more above mentioned heat storage and conducting materials.

6. The solar cooking appliances according to claim 1, wherein said first solid heat storage and conducting material is selected from a group of:
   a combination of two or more different solid materials,
   said solid heat storage and conduction material mixing with a few liquid material, wherein said liquid material can be heated to a temperature higher than the water boiling temperature,
   quartz sand containing colza oil, and
   basalt sand containing bean oil.

7. The solar cooking appliance according to claim 1, wherein said solar cooking utensil is selected from a group of:
   a stainless steel container, wherein said container having a removable and detachable handle at an internal wall and a pleated structure on a external wall from top to bottom to provide a gap and path for air exchange, power cable and allow a minor adjustable diameter for said container,
   a coffee maker,
   a tea maker,
   a steamer,
   a fryer with a wire mesh for frying and draining a food,
   a whisker net to press the food to an internal wall of said utensil for food roasting and baking, and a wok and pot, and
   a pan, wherein one or more small frying pan(s) in parallel suspended in the utensil for fry, sauté or brown a food.

8. The solar cooking appliance according to claim 1, further comprises:
   a trestle for arranging and supporting the parts of the solar cooking appliances;
   an inclining structure for adjusting angle of said solar heat collector to sunlight;
   a directional structure for adjusting direction of said solar heat collector to sunlight;
   a light reflector to focus surrounding sunlight to the solar heat collector.

9. The solar cooking appliance according to claim 1, further comprises a bag or a membrane/foil for wrapping or covering a food to be cooked in the solar cooking appliance, wherein said bag or membrane/foil is made of a material selected from the group of a metal, a paper, a plastic and their combination.

10. The solar cooking appliance according to claim 1, further comprises a suitcase for storing said solar cooking appliance to form a portable solar cooking appliance.

11. The solar cooking appliance according to claim 1, wherein said removable solar cooking utensil includes a removable handle for removing said utensil from said solar cooking appliance.

12. The solar cooking appliance according to claim 1, wherein, said pleated structure is formed on said wall of said cylindrical container from a first circular end to a second circular end of said cylindrical container, and said gap is formed between said pleated structure and said wall of said cylindrical container.

13. The solar cooking appliance according to claim 1, wherein said solar heat collector is evacuated between said outer transparent tube and said inner tube.

* * * * *